April 21, 1925.
J. E. PERRAULT
1,534,409
MOLD FOR MAKING HARD RUBBER CONTAINERS
Filed July 16, 1924   2 Sheets-Sheet 2
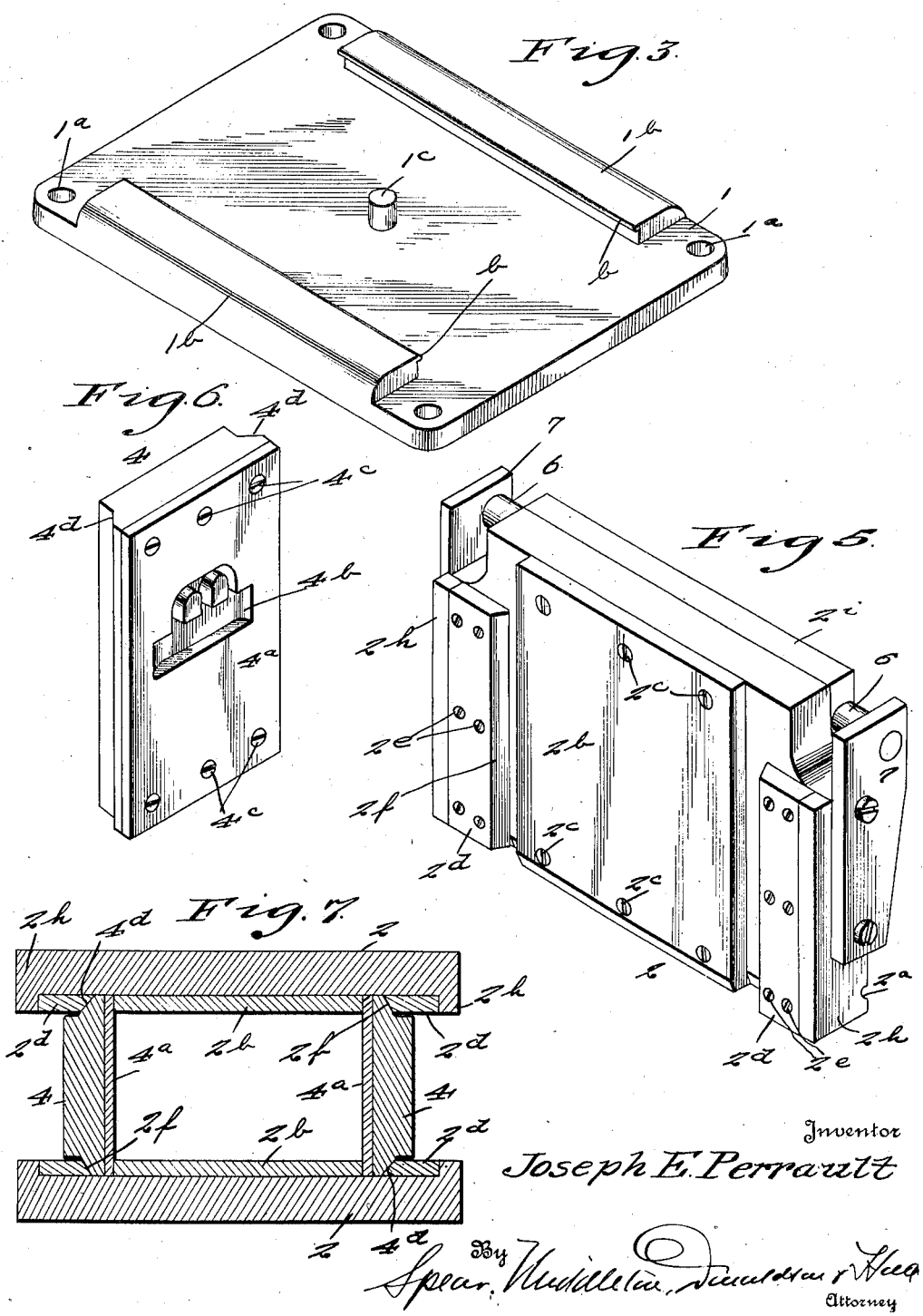

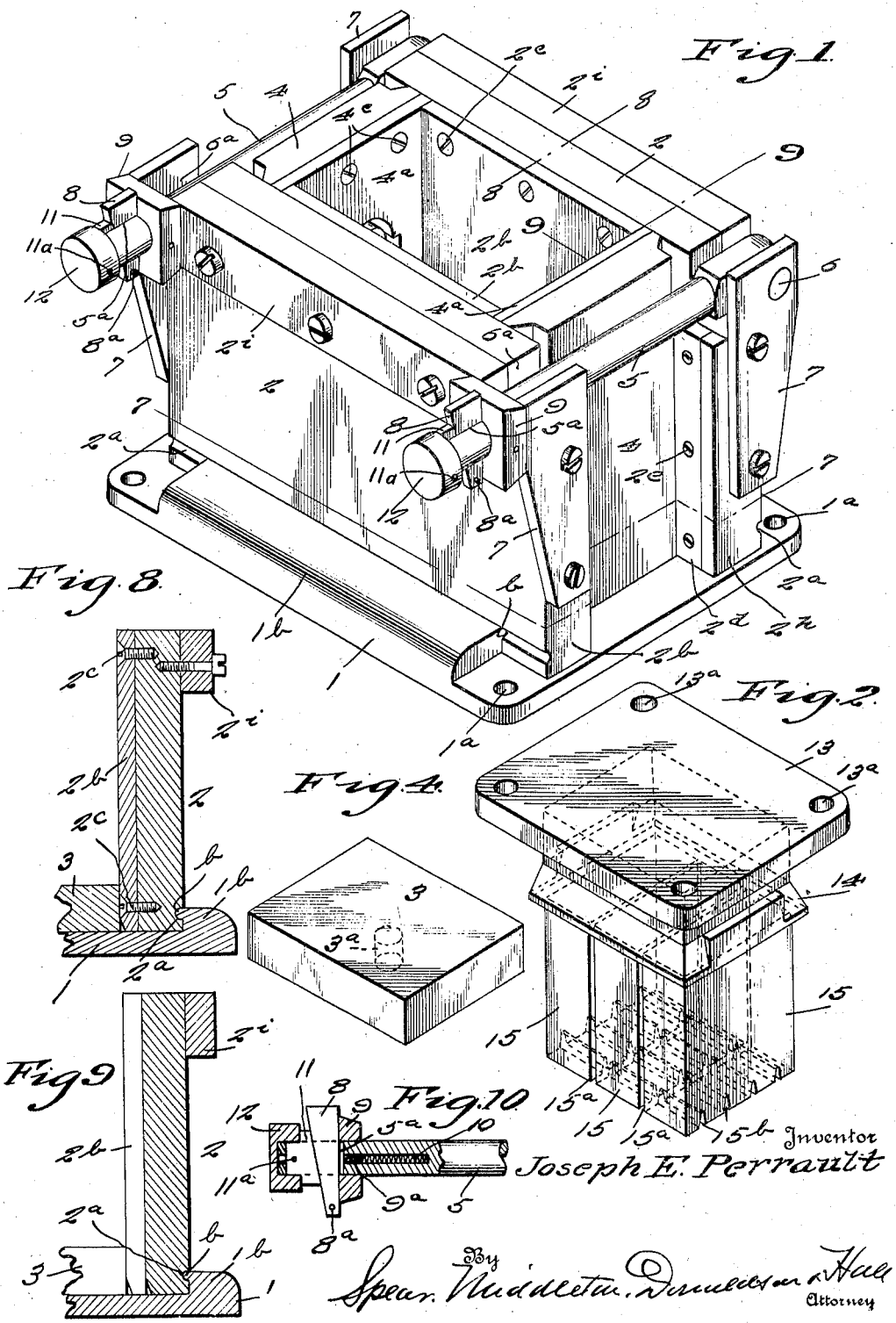

Patented Apr. 21, 1925.

1,534,409

UNITED STATES PATENT OFFICE.

JOSEPH E. PERRAULT, OF WATERTOWN, MASSACHUSETTS, ASSIGNOR TO HOOD RUBBER COMPANY, OF WATERTOWN, MASSACHUSETTS, A CORPORATION OF MASSACHUSETTS.

MOLD FOR MAKING HARD-RUBBER CONTAINERS.

Application filed July 16, 1924. Serial No. 726,342.

*To all whom it may concern:*

Be it known that I, JOSEPH E. PERRAULT, a citizen of the United States, and resident of Watertown, in the county of Middlesex and State of Massachusetts, have invented certain new and useful Improvements in Molds for Making Hard-Rubber Containers, of which the following is a specification.

My present invention relates to improvements in molds for making hard rubber battery boxes and aims to provide a simple, economical and efficient construction which may be readily manipulated and which may be easily changed to produce boxes of different sizes or shapes.

With these and other objects in view, the invention includes the novel features of construction and arrangement and combination of parts hereinafter described and particularly defined by the appended claims.

In the accompanying drawings—

Figure 1 is a perspective view of a box mold constructed in accordance with my invention.

Fig. 2 is a similar view of the top plate and mandrel or cone members for forming the hollow interior of the box.

Fig. 3 is a perspective view of the bottom plate.

Fig. 4 is a similar view of the bottom mold face member.

Fig. 5 is a perspective view of one of the side mold members looking at the inner face.

Fig. 6 is a perspective view of one of the end members.

Fig. 7 is a horizontal section on line 7—7 of Fig. 1.

Fig. 8 is a detail section on line 8—8 of Fig. 1.

Fig. 9 is a detail section on line 9—9 of Fig. 1.

Fig. 10 is a detail section through the wedge bolt.

Referring by reference characters to these drawings, the numeral 1 designates a bottom or mold supporting plate which is designed to be secured to the bottom platen of an ordinary platen press (not shown) such as is customarily used in plants employed in the production of goods. The plate 1 may be provided with bolt holes $1^a$ at its corners for the reception of bolts or screws for holding it to the platen.

Said bottom plate is provided along its opposite side edges with raised portions $1^b$ (preferably integral) which have undercut inner edges providing overhanging or projecting lips, beads or flanges $b$ which cooperate with the grooves $2^a$ in the external faces of the mold side plates 2 in the manner hereinafter more fully described.

Cooperating with the bottom plate 1 is a removable bottom mold face member 3 which is designed to be placed on the bottom plate 1 between the side flanges or raised portions $1^b$ and which may be properly centered thereon by suitable means such as a dowel pin (or pins) $1^c$ adapted to engage a dowel recess $3^a$ in the under side of the bottom mold face.

The end mold members are duplicates of each other and each comprises an end plate member 4 to which is removably secured an end mold face plate $4^a$, the means employed for detachably holding it in place comprising, in the present instance, screws having countersunk heads, as indicated at $4^c$. Each end plate 2 is further provided with beveled or inclined shoulders $4^d$ for cooperating with corresponding parts on the side plate members, as hereinafter described, and is also provided with recesses $4^b$ shaped to form the battery box handles.

The side members 2 are likewise duplicates of each other, except as to the detail of the mold clamping means, and each of said side members 2 has removably secured to its inner face a side mold face member $2^b$ secured thereto by countersunk screws $2^c$ at top and bottom, similar to the screws $4^c$ of the end plates, and a pair of what I may term sizing plates $2^d$ detachably held in place by screws $2^e$ and spaced from the face plate $2^b$ to leave vertical channels or grooves to receive the edges of the end mold members 4, the inner edges of the sizing plates being beveled or inclined as indicated at $2^f$ to cooperate with the beveled shoulders $4^d$ of the end members as shown in Fig. 7. The side plates may be provided with integral shoulders $2^h$ abutting the outer edges of the sizing plates to take the strain off the screws $2^e$.

In assembling the parts above described, the bottom face member 3 is placed on member 1 and the end members are then set on said plate member 1 with their lower face edges pressed against or juxtaposed to the ends of the member 3, which latter covers the lower row of screws. The bottoms of the end members are of sufficient area to cause these to stand erect for assembling purposes. The side members are then assembled with their grooves 2ª in engagement with the ribs $b$, and the edges of the end members resting in the grooves or channels formed between the plates 2ᵇ and 2ᵈ, whereupon the side members are drawn together by clamping means to cause the beveled surfaces 2ᶠ and 4ᵈ to cooperate to bind or wedge the face plates 4ª tightly against the edges of face plates 2ᵇ, a box-like structure having an open top being thus provided.

My preferred form of clamping means comprises bolt members 5 hinged at one end on pins 6 carried by one of the side plates.

Preferably the upper edge of the side member is reinforced by a bar 2ᵗ and the pins are supported by the ends of this bar and the end supporting members 7, the corners of the side members and corresponding parts of the reinforcing bars being cut away or dimensioned to leave recesses to receive the eye portions of the bolts 5, through which eye portions the pins pass.

The pins may be made integral with, or welded or otherwise rigidly attached to the bars 2ᵇ and the outer ends thereof are supported by said members 7 which are attached to the ends of the side members 2 by means such as screws, as shown in Figs. 1 and 5.

The other side member is of exactly the same construction as that just described except that it lacks only the pins 6, having in place thereof merely open recesses 6ª to receive the free ends of the bolts 5 (see Fig. 1). The said free ends are longer than the end dimensions of the mold and are provided with vertical slots 5ª to receive wedge keys 8 which, when inserted and forced downward, serve to draw the side members 2 towards each other, thrust blocks 9 being interposed between the keys and side members to bridge the bolt receiving recesses.

Preferably means are provided whereby the wedges may be held in place in unlocked position to prevent loss of parts when the mold is open, and to facilitate closing. A convenient means of effecting this is to provide each wedge with a transverse cotter pin 8ª which prevents its complete withdrawal from the slot, and to make the corresponding bearing block slidable on the rod and spring pressed towards the wedge so that when the wedge is drawn up to the limit permitted by the pin, the block 9 will be pushed back keeping the parts in unlocked position.

To this end each block 9 may be keyed to the bolt 5 by a transverse pin 9ª slidable in a transverse slot in the bolt and pressed upon by a spring 10 seated in a cavity bored in the bolt.

A cotter piece 11 is provided in the outer end of the wedge receiving slot having a bearing face inclined to correspond to the taper of the wedge and this and the cap or collar 12 may be held in place by means such as pin 11ª.

Cooperating with the box mold thus described is a closure member carrying a core or mandrel for forming the hollow interior of the box. This comprises a top plate support 13 to which is secured (or formed integral therewith) a top plate 14 for forming the mold closure, from which depends the mandrel or mandrels 15. The support 13 is designed to be removably secured to the upper platen of the press (not shown) by means such as screws or bolts passing through the openings 13ª. The mandrel or core is shaped according to the desired box interior and that shown in Fig. 2 is adapted to form three cell compartments, and therefore comprises three spaced core projections, the spaces 15ª between which form the cell partitions. The bottoms of the cores are provided with transverse grooves 15ᵇ for forming the customary battery supports or bridges.

It is believed that the manner of using the mold will be obvious from the foregoing description, but it may be briefly stated as follows:—In the starting position the upper platen or plunger of the press would be elevated, and hence the top plate and core would be held above the top of the mold. The side plates 2 would be moving down, fulcruming on ribs $b$ and the end plates move away from bottom mold face member 3. The proper quantity of rubber compound (determined by weight) for forming the box, is then placed on bottom member 3 and the side and end members brought into box forming position as hereinbefore described, and the bolts 5 moved down into their receiving recesses and the wedges tightened to draw the parts firmly together. The press is now put in action which causes the mandrel to enter the mold cavity and upon the latter reaching the rubber, the latter is placed under pressure and caused to flow in between the several core members and between the latter and the mold members. It will be understood that the mold is heated during the molding action by suitable means, but as the heating means forms no part of my invention, illustration thereof is deemed unnecessary.

A slight excess of rubber is included in the original amount, and this passes as a thin film between the lower edge of the top plate and top edges of the side and end plates of the mold, this excess being later trimmed from the box. The heat first softens the rubber, facilitating its flow and being maintained for the proper time and degree, causes the article to be vulcanized. On completion of vulcanization, the plunger is with-drawn, the lips *b* holding the side plates down to the bottom plate, and the friction of the side plates on the end plates holding down the end plates, while both side and end plates retain the completed box. Then the wedge bolts are released and swung back and the completed battery box removed. The mold is then in the starting position noted above, ready for manufacturing another box.

Such a mold is readily adjustable or convertible to make boxes of various dimensions. For example, the height of the box is determined by the distance of the lower lip of the top plate from the upper surface of the bottom mold face plate 3 when the mold is closed. Increasing or decreasing the thickness of the bottom mold plate 3, or top plate, or both, will correspondingly vary the height of the box.

The interior of the box is determined by the number, size and shape of the mandrels used.

Increasing or decreasing the thickness of the side mold faces and at the same time decreasing or increasing the width of the top plate and bottom mold face, will decrease or increase the width of the box. The length of the box can be changed by two methods or by combination of two methods. First; by varying the end mold faces by changing their thickness in combination with corresponding change in top plate and bottom mold face exactly as above described for changing the width of the boxes by changing thickness of side plates with this addition, the width of side plates must be also varied to suit changes in thickness of end plates. Second; by reducing width of side mold face and making corresponding increases in the sizing plates, distance between the end plates and therefore the distance between the inner faces of the end mold faces is reduced and the cavity for forming the battery box shortened. The length of the bottom mold face and top plate are changed to correspond. To lengthen the cavity for forming the battery box reverse the above operations.

The several mold faces can also be formed in many different ways to produce various exteriors to the boxes.

It will thus be seen that boxes of all sizes and shapes can be made by this mold within the limits of the device, by simply changing comparatively cheap plates and without disturbing the setting on the press. Only one set of the massive parts of the mold which are required for strength and are expensive to make are needed per press, and as the heating system is applied to these larger parts it also remains the same for all boxes.

Having thus described my invention, what I claim is:—

1. In a mold of the character described, a bottom plate having flanges along two of its opposite sides, a removable bottom mold face member carried by said bottom plate and of less width than the distance between said flanges, removable side plates having their lower ends seated in said grooves, end plates adapted to rest upon the bottom plate between said side plates, and means for drawing said side plates towards each other.

2. A mold of the character described, comprising a bottom plate, a bottom mold face member removably carried thereby, side and end plates cooperating with said bottom plate, side and end facing plates detachably carried by said side and end plates and cooperating with said bottom facing plate to form the mold cavity, said end plates having beveled edges, and auxiliary detachable facing plates secured to said side plates and spaced from the edges of the side facing plates, and having beveled edges cooperating with the beveled edges of the end plates, and a closure member carrying core means for forming the box cavity.

3. A mold of the character described, comprising a bottom plate having parallel flanges adjacent two of its opposed edges, side plates having their lower edges adapted to be engaged thereby and carrying detachable facing plates, a removable bottom facing plate lying between the lower edges of said side facing plates, end plates carrying removable facing plates and adapted to lie between said side plates and abut the edges of said side and bottom facing plates, clamping means for connecting said side and end plates, and mold closure means cooperating therewith.

4. In a mold of the character described, a bottom plate having flanges along two of its opposed sides provided with lips or beads projecting towards each other, side plates having grooves in their outer faces near their bottom edges to receive said beads, end plates adapted to rest upon said bottom plate between said side plates, and means for drawing said side plates towards each other.

5. In a mold of the character described, a bottom plate having flanges along two of its opposed sides provided with lips or beads projecting towards each other, side plates having grooves in their outer faces near their bottom edges to receive said beads, end plates adapted to rest upon said bottom plate between said side plates, and means for drawing said side plates towards each other, said end plates having beveled edges and said side plates carrying beveled shoulders cooperating therewith.

6. In a mold of the character described, a bottom plate having flanges along two of its opposed sides provided with lips or beads projecting towards each other, side plates having grooves in their outer faces near their bottom edges to receive said beads, end plates adapted to rest upon said bottom plate between said side plates, swing bolts pivotally connected to one of said side plates at the ends thereof, the other side plate having recesses to receive the free ends of said bolts, and means carried by said free ends for exerting pressure to draw said side plates together.

7. In a mold of the character described, the combination with a bottom plate, end plates, and side plates embracing the ends of the end plates, of clamping means therefor comprising swing bolts pivotally connected to one of said side plates, the other side plate having recesses through which the free ends of the bolts project, said free portions having longitudinal slots, and wedges cooperating with said slots.

8. In a mold of the character described, the combinattion with a bottom plate, end plates, and side plates embracing the ends of the end plates, of clamping means therefor comprising swing bolts pivotally connected to one of said side plates, the other side plate having recesses through which the free ends of the bolts project, said free portions having longitudinal slots, blocks having openings slidably engaging said bolts, and adapted to abut the recessed portions of said recessed side plate, and wedges in said slots in rear of said blocks.

9. In a mold of the character described, the combination with a bottom plate, end plates, and side plates embracing the ends of the end plates, of clamping means therefor comprising swing bolts pivotally connected to one of said side plates, the other side plate having recesses through which the free ends of the bolts project, said free portions having longitudinal slots, blocks having openings slidably engaging said bolts, and adapted to abut the recessed portions of said recessed side plate, and wedges in said slots in rear of said blocks, there being spring means tending to press said blocks towards said wedges, and means for permanently retaining the wedges in the slots.

In testimony whereof, I affix my signature.

JOSEPH E. PERRAULT.